US010953315B2

United States Patent
Inkster

(10) Patent No.: US 10,953,315 B2
(45) Date of Patent: Mar. 23, 2021

(54) CARD GAME PLAYING CARD

(71) Applicant: Bela Inkster, Western Australia (AU)

(72) Inventor: Bela Inkster, Western Australia (AU)

( * ) Notice: Subject to any disclaimer, the term of this patent is extended or adjusted under 35 U.S.C. 154(b) by 0 days.

(21) Appl. No.: 16/603,689

(22) PCT Filed: May 8, 2018

(86) PCT No.: PCT/AU2018/050421
§ 371 (c)(1),
(2) Date: Oct. 8, 2019

(87) PCT Pub. No.: WO2018/204971
PCT Pub. Date: Nov. 15, 2018

(65) Prior Publication Data
US 2020/0030685 A1 Jan. 30, 2020

Related U.S. Application Data

(60) Provisional application No. 62/503,900, filed on May 9, 2017.

(51) Int. Cl.
*A63F 1/04* (2006.01)
*A63F 3/06* (2006.01)
(Continued)

(52) U.S. Cl.
CPC .............. *A63F 3/0665* (2013.01); *A63F 1/02* (2013.01); *A63F 9/0604* (2013.01); *B32B 27/08* (2013.01);
(Continued)

(58) Field of Classification Search
CPC ........ A63F 2003/067; A63F 2003/0675; A63F 3/0665; A63F 2001/0458;
(Continued)

(56) References Cited

U.S. PATENT DOCUMENTS 4,568,403 A * 2/1986 Egan .................. G09F 3/02
156/247
5,411,784 A * 5/1995 Brewster ............ G09F 3/02
40/584
(Continued)

FOREIGN PATENT DOCUMENTS

AU 2004222720 A1 5/2006
CA 2559337 A1 * 3/2007 ........... A63F 3/0415

OTHER PUBLICATIONS

"The Real Time Card Game I Didn't Know I Wanted," Grand Gamers Guild, published on Nov. 19, 2016, retrieved from the Internet on Jun. 25, 2018 by Australian International Searching Authority, <URL: https://grandgamersguild.com/real-time-card-game-didnt-know-wanted/>.

(Continued)

*Primary Examiner* — Benjamin Layno
(74) *Attorney, Agent, or Firm* — Mendelsohn Dunleavy, P.C.; Steve Mendelsohn

(57) ABSTRACT

A playing card having a substrate entirely of a first predetermined colour overlaid with a removable surface coating entirely of a second predetermined colour contrasting with said first predetermined colour, said removable surface being sufficiently friable so as to be able to be scratched off by a player in a pattern predetermined by said player to reveal said substrate in said pattern. The scratched playing card uses the high contrasting colors (typically primary and secondary colors) to produce letters or image(s). These cards are interchangeably used in a strategic and non gambling card game often utilising the Stroop effect.

18 Claims, 7 Drawing Sheets

(51) Int. Cl.
*A63F 1/02* (2006.01)
*A63F 9/06* (2006.01)
*B32B 27/08* (2006.01)
*A63F 3/04* (2006.01)

(52) U.S. Cl.
CPC .............. *A63F 1/04* (2013.01); *A63F 3/069* (2013.01); *A63F 2001/0458* (2013.01); *A63F 2001/0466* (2013.01); *A63F 2001/0475* (2013.01); *A63F 2003/0426* (2013.01); *A63F 2003/067* (2013.01); *A63F 2003/0675* (2013.01); *A63F 2009/0606* (2013.01)

(58) Field of Classification Search
CPC ...... A63F 2001/0466; A63F 2001/0475; A63F 2003/0426; A63F 3/069; A63F 1/04
USPC .............. 273/139, 293, 295, 299, 302, 308; 283/901, 903
See application file for complete search history.

(56) References Cited

U.S. PATENT DOCUMENTS

| | | | |
|---|---|---|---|
| 6,241,246 B1* | 6/2001 | Guttin | A63F 3/0665 273/138.1 |
| 7,530,570 B2* | 5/2009 | Nulph | A63F 3/0665 273/139 |
| 2002/0190115 A1 | 12/2002 | Schuren et al. | |
| 2003/0104174 A1 | 6/2003 | Itakura et al. | |
| 2012/0021188 A1* | 1/2012 | White | G09F 3/0292 428/195.1 |
| 2017/0209783 A1* | 7/2017 | Finnerty | A63F 3/0655 |

OTHER PUBLICATIONS

Steel, Oliver, "Stroop: A Card Game," published on Sep. 8, 2012, retrieved from the Internet on Jun. 25, 2018 by Australian International Searching Authority, <URL: https://blog.osteele.com/2012/09/stroop-a-card-game/>.

"F**k. The Game," published on May 17, 2015, retrieved from the Internet on Oct. 8, 2019; <URL: https://www.youtube.com/watch?v=o7z0cR-MHvk&t=29s>.

International Search Report and Written Opinion, dated Jul. 5, 2018 for the corresponding PCT Application No. PCT/AU2018/050421.

* cited by examiner

COLOR KEY

RED

ORANGE

YELLOW

GREEN

BLUE

PURPLE

BLACK

CARD GAME PLAYING CARD

TECHNICAL FIELD

This invention relates to a card game, and in particular to playing cards for use with a plurality of playing cards of predetermined format in a card game.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

The inventor has devised a card game where players are dealt from a deck of cards, a number of cards face down, bearing words which are colored black or a color having an unambiguous and commonly understood identifying name, typically a primary or secondary color selected from red, orange, yellow, green, blue and purple.

These words are printed a contrasting color background, so as to be visible. Thus the card has a coloured surface providing the contrasting color of the background to the color of the word. The contrasting color of the background also has an unambiguous and commonly understood identifying name, and is also typically a primary or secondary color selected from red, orange, yellow, green, blue and purple. While not absolutely necessary, for best effect, throughout the deck, the colors adopted for the background, with the exception of black, are the same colors used for the words.

The colors used for the words and for the background surface are solid colors, or rendered in a way so as to visually present to the eye as a clearly identifiable single color That is to say, there is no shading or pattern of different colors forming the card background or the word, in a way that the player could not identify a single color. The player of the game should be able identify the name of a single colour without any ambiguity, although it is noted that there may be some conjecture over whether purple is violet or vice versa. Other colors that can unambiguously be identified may be used, such as pink or grey. The important point, as will be understood from the following discussion regarding game play, is that the player shall not be required to identify colors by names often used in paint color charts, such as seafoam, arctic, sand dollar, hog bristle, or the like.

The obverse of the cards can carry a common pattern such as the manufacturer's trade mark, and is of no consequence.

The words printed on the cards are the name of a colour printed in black ink or in an ink of a color, and curse words printed in black ink or in an ink of a color, in both cases the color being as noted above. The color background contrasts with the color of the word.

The words which are the name of a color selected from red, orange, yellow, green, blue, or purple, printed in black or printed in a color selected from red, orange, yellow, green, blue, or purple. The curse words may comprise low level coarse language words and high level coarse language words. The low level coarse language words are swear words or curse words that generally do not cause offence to most sections of the community and can be selected from words such as (expletives deleted) and the like. A high level coarse language word is considered to be more confronting and can be the four letter words meaning fornicate (i.e. (expletive deleted)). Gameplay proceeds differently, depending on whether the curse word is deemed or considered to be a high level coarse language word.

The text content of words on cards in a game can be varied to suit the language and culture of a target market.

The card game requires players in turn, to turn up a card and place it word side up in the center of the table. Then as quickly as possible call out the correct answer based on the games rules. The game rules are as follows:

where the word is the name of a color printed in black, the player must state the background color;

where the word is the name of a color printed in a color, the player must state the color that the word is printed in;

where the word is a low level coarse language word, the player must state the word; and where the word is a high level coarse language word, which is ostensibly impolite to use, the rules are the same as for the name of the color.

If the player is correct and says the answer in a fast enough time then the card stays word side up on the table. The next player in turn plays on top of the previously played card. The game proceeds in this manner, and the first player to play out all of their cards in this manner is the winner of the game. If the player says the incorrect answer or takes a long time to answer then the other players will complete to slap the placed card. The first player to slap the placed card can choose to distribute two cards from the played cards to any one or two players and the remaining played cards are picked up by the player who answered incorrectly. The player who answered incorrectly will take their turn again until they are correct after which the next person will take their turn.

The game makes use of the Stroop effect and contrasts this with the ease of saying a common word, curse words in this case. To increase the Stroop effect, the cards also use a flat color background. Typically, the Stroop effect is only displayed on a white background. In psychology, the Stroop effect is a demonstration of interference in the reaction time of a task. When the name of a color (e.g., "blue", "green", or "red") is printed in a color that is not denoted by the name (e.g., the word "red" printed in blue ink instead of red ink), naming the color of the word takes longer and is more prone to errors than when the color of the ink matches the name of the color.

The reason for using swear words and color words is to contrast and confuse the brain by using mentally challenging Stroop effect color words and words that are not mentally challenging. Take stubbing ones toe and cursing for example, there is no thinking involved and cursing is often involuntary. During a typical game this contrast between the words can confuse even the most intelligent players.

It is an object of the present invention to provide a playing card for use in a card game where players take turns to call out information where the card game utilizes the Stroop effect.

Throughout the specification unless the context requires otherwise, the word "comprise" or variations such as "comprises" or "comprising", will be understood to imply the inclusion of a stated integer or group of integers but not the exclusion of any other integer or group of integers.

In this specification, color also is taken to include the colors black and white, in addition to other colors which are readily identifiable by ordinary persons, such as red, orange, yellow, green, blue, purple (or violet), grey and pink.

SUMMARY OF INVENTION

In accordance with the present invention, there is provided a playing card having a substrate with a first surface substantially entirely of a first predetermined colour overlaid with a removable surface coating having a second surface substantially entirely of a second predetermined colour contrasting with said first predetermined colour, said removable surface being sufficiently friable so as to be able to be scratched off by a player in a pattern predetermined by said player to reveal said substrate in said pattern.

Preferably said first surface is substantially entirely of said first predetermined colour to the extent that the very peripheral edge of said playing card does not reveal said first predetermined colour. In this manner, the color that underlies the removable surface cannot be seen until after the card has been selected during game play, and the player has commenced to rub or scrape off part of the removable coating.

Preferably said removable surface coating entirely overlays said substrate.

Also in accordance with the present invention, there is provided a playing card to be used in a deck of playing cards used in a card game where players take turns to call out information where the card game utilizes the Stroop effect, said playing card having a substrate with a first surface substantially entirely of a first predetermined colour overlaid with a removable surface coating having a second surface substantially entirely of a second predetermined colour contrasting with said first predetermined colour, said removable surface being sufficiently friable so as to be able to be scratched off by a player in a pattern predetermined by said player to reveal said substrate in said pattern.

Preferably said first surface is substantially entirely of said first predetermined colour to the extent that the very peripheral edge of said playing card does not reveal said first predetermined colour. In this manner, the color that underlies the removable surface cannot be seen until after the card has been selected during game play, and the player has commenced to rub or scrape off part of the removable coating.

Preferably said removable surface coating entirely overlays said substrate.

Also in accordance with the invention, there is provided a deck of playing cards comprising at least one card as described above.

Still further, in accordance with the invention there is provided a deck of playing cards comprising a plurality of playing cards as described above, provided with a plurality of different first predetermined colors and different second predetermined colors. Each card in the deck of playing cards has a single first predetermined color and a single second predetermined color. There may be more than one card having the same first predetermined color and there may be more than one card having the same second predetermined color.

BRIEF DESCRIPTION OF DRAWINGS

Two preferred embodiments of the invention will now be described with reference to the drawings in which.

DESCRIPTION OF EMBODIMENTS

Figure 1:
FIG. 1 is a color key to the colors used in playing card of both the prior art and the embodiments of the invention.
Figure 1:
Figure 1:
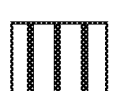
Figure 1:
Figure 1:
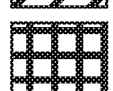
Figure 1:
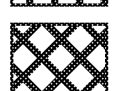
Figure 1:
Figure 2:
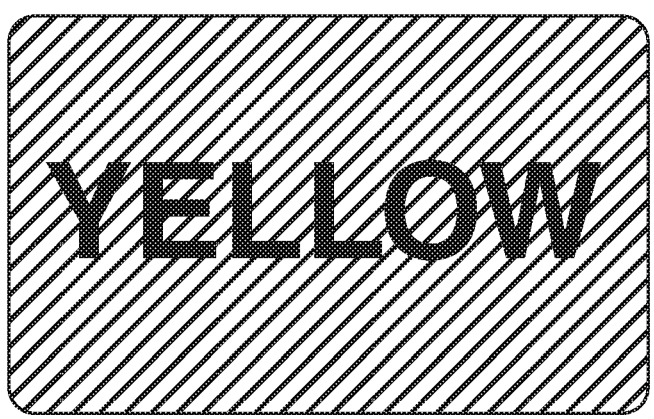
FIG. 2 is a prior art playing card used in a deck of playing cards used in a card game where players take turns to call out information where the card game utilizes the Stroop effect, being the word YELLOW rendered in black on a green colored background.
Figure 3:
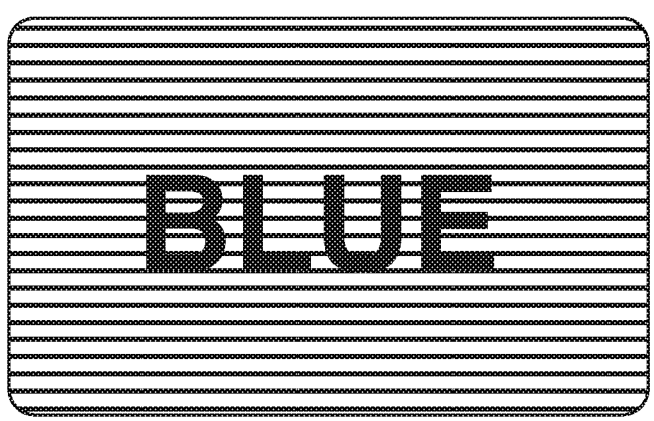
FIG. 3 is a further prior art playing card used in the deck of playing cards, being the word BLUE rendered in black on a red colored background.
Figure 4:
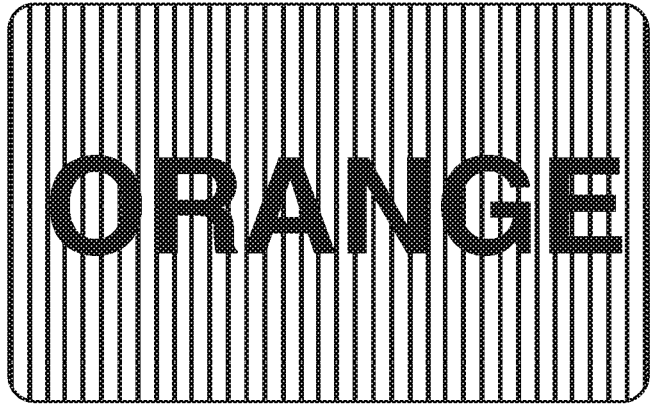
FIG. 4 is a further prior art playing card used in the deck of playing cards, being the word ORANGE rendered in black on a yellow colored background.
Figure 5:
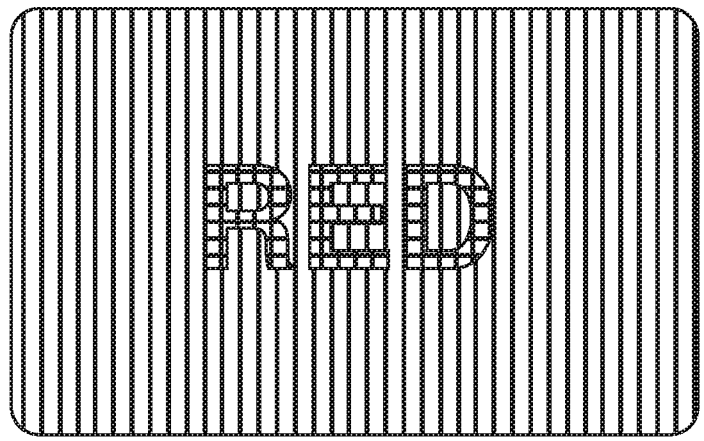
FIG. 5 is further prior art playing card used in the deck of playing cards, being the word RED rendered in blue on a yellow colored background.
Figure 6:
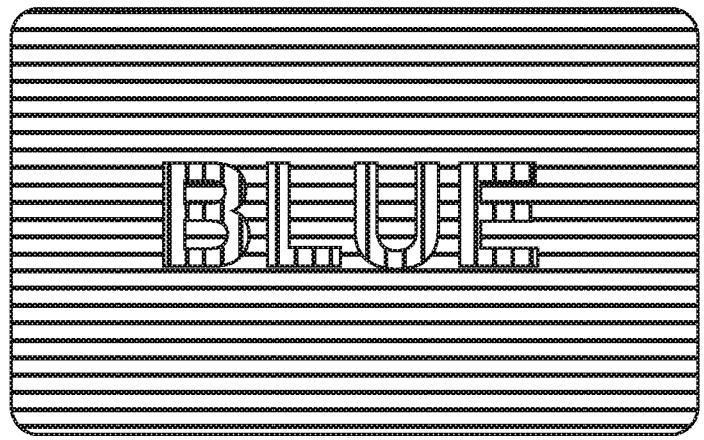
FIG. 6 is a further prior art playing card used in the deck of playing cards, being the word BLUE rendered in yellow on a red colored background.
Figure 7:
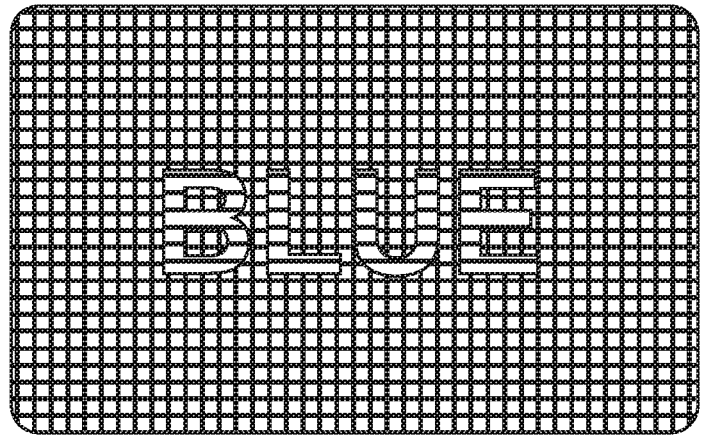
FIG. 7 is a further prior art playing card used in the deck of playing cards, being the word BLUE rendered in red on a blue colored background.

With reference to the description of the Stroop effect game of the prior art, as discussed above, and referring to FIGS. 2 to 11, where a player draws a playing card which is a word representing a color, where the word is colored black, the player calls out or states the color of the background of the playing card. Thus, the correct answer for a card drawn by a player as illustrated in FIG. 2 is "green". The correct answer for a card drawn by a player as illustrated in FIG. 3 is "red", and the correct answer for a card drawn by a player as illustrated in FIG. 4 is "yellow".

Where a player draws a playing card which is a word representing a color, where the word is colored other than black, the player calls out or states the color that the word is rendered in. Thus the correct answer for a card drawn by a player as illustrated in FIG. 5 is "blue". The correct answer for a card drawn by a player as illustrated in FIG. 6 is "yellow", and the correct answer for a card drawn by a player as illustrated in FIG. 7 is "red".

Figure 8:
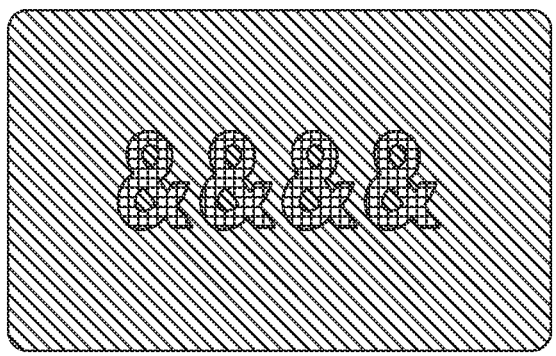
FIG. 8 is a further prior art playing card used in the deck of playing cards, being a low level coarse language word (expletive deleted) rendered in blue on an orange colored background.
Figure 9:
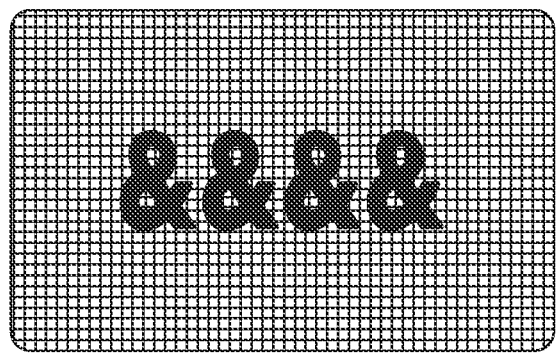
FIG. 9 is a further prior art playing card used in the deck of playing cards; being the low level coarse language word (expletive deleted) rendered in black on a red colored background.

The rule for cards as illustrated in FIGS. 8 and 9 which show a low level coarse language curse word, is for the player drawing the card to call out the curse word, regardless of its color. However, where the curse word is a high level coarse language curse word, considered to be impolite to use, the rule for words representing colors is applicable. Thus a player drawing a card illustrated in FIG. 10 would call out the color of the word which is "red", and a player drawing a card as illustrated in FIG. 11 would call out the background color of the card which is "red".

Figure 10:
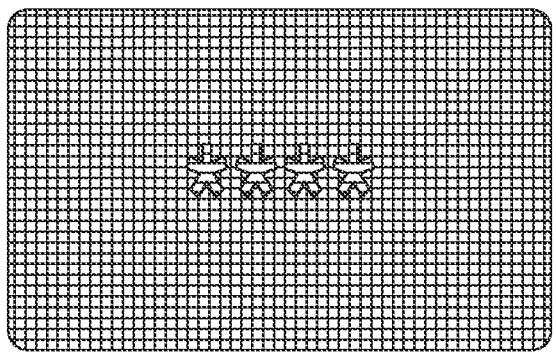
FIG. 10 is a further prior art playing card used in the deck of playing cards, being a high level coarse language word (expletive deleted) rendered in red on a blue colored background.
Figure 11:
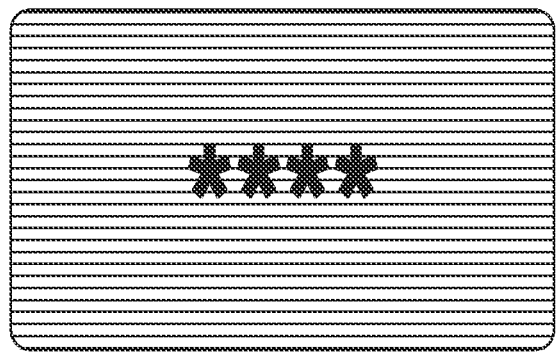
FIG. 11 is a further prior art playing card used in the deck of playing cards, being the high level coarse language word (expletive deleted) rendered in black on a red colored background.

The word illustrated in FIGS. 10 and 11 has been chosen to have its own rule because it is so frequently used in the English language. It is the "go to" curse word for many players and can cause them to say this word instead of the correct answer, which adds to the entertainment of the game in play.

The embodiments provide a customizable playing card which can be incorporated with cards according to the prior art, allowing players to improvise in the game. The embodiment provides a playing card having a substrate which can be of paper-based card or plastic based or plastic coated card. Any of these materials may be dyed through in a first predetermined color selected from red, orange, yellow, green, blue, purple or black, or provided in their natural state and printed with the entire first or playing side surface colored in the first predetermined color selected from red, orange, yellow, green, blue, purple or black. The obverse or non-playing surface can be printed with indicia such as the name of the game, brand, trademark and manufacturer information.

The first or playing side surface is overlaid with a removable surface coating having a second surface substantially entirely of a second predetermined color selected from red, orange, yellow, green, blue, or purple, but not black, and contrasting with the predetermined colour of the card or its coating. This removable surface coating is applied so as to obscure the underlying color of the first or playing side surface. While in this particular embodiment, the second predetermined color is stated as not being black, black could be utilised as a second predetermined color, subject to variation to the rules of the card game.

The removable surface coating is sufficiently friable so as to be able to be scratched off by a player using a coin or fingernail. The player scratches the coating off in order to reveal the color of the first or playing side surface that underlies the removable surface coating and may do so in any manner that the player determines, in any pattern to form a shape or a word of the color of the first or playing side surface against a background which is the color of the removable surface coating. The card as modified by the player is then used in the gameplay, according to the rules.

The removable surface coating may be a composition entirely of the second predetermined color, or the second predetermined color may be printed onto the surface of the removable surface coating.

The scratched playing card uses the high contrasting flat colors (typically primary and secondary and complementary flat colors) to allow the player to produce letters or images. These cards are interchangeably used in the strategic and non-gambling card game often utilizing the Stroop effect.

Figure 12:
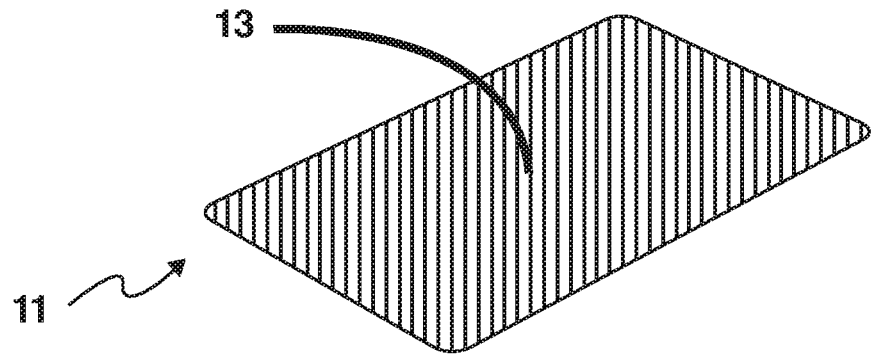
FIG. 12 is a perspective view of a completed card according to both embodiments of the invention.

Referring to FIG. 12, one example of a card 11 according to either embodiment is illustrated. The card 11 has an upper surface in a second predetermined color, in the form of a removable friable surface coating 13 which in this example is colored yellow. The upper surface in yellow covers the entire surface area of the playing card. This upper surface is friable so that as it is scratched off it crumbles away to reveal the underlying card.

Figure 13:
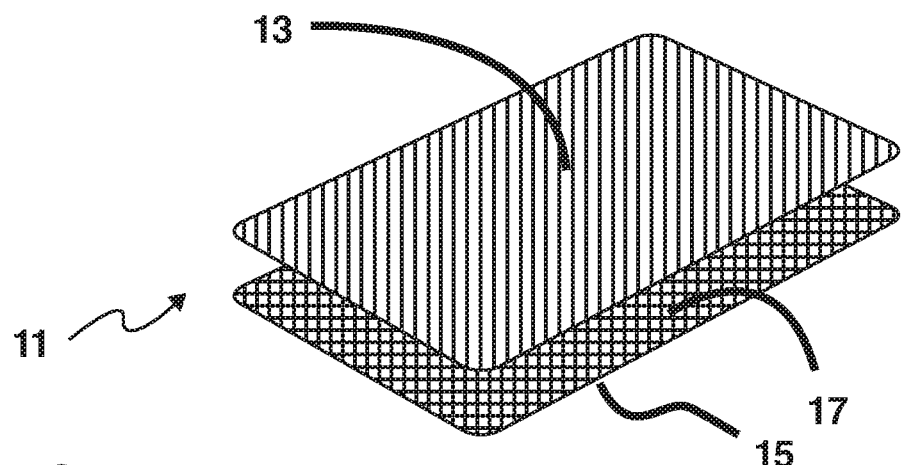
FIG. 13 is an exploded perspective view of one example of a completed card according to a first embodiment.

Referring to FIG. 13, the first embodiment of the card 11 is shown in exploded perspective view. The card 11 has a paper-based card substrate 15 which is surface printed on the playing side 17 in a first predetermined color which in this example is the color blue. This printed color is protected with a varnish coating as is known in the production of ordinary playing cards, to prolong their protection in use, but in the embodiment this protects the underlying printed color, when the removable surface coating 13 is scratched off in game play. A silicone release coat is applied over the top of the varnish coating, in order to aid removal of the scratchable surface coating that is to be applied.

The removable friable surface coating 13 is applied over the top of the silicone release coat on the playing side 17 in order to completely obscure the first predetermined color of the playing side 17. The removable friable surface coating 13 is formed from as many coats as necessary of a white latex ink which is colored entirely through its composition with a dye in order to impart the required color. After heat curing of the latex ink layer or layers, a clear polyester film or lithographic varnish is then applied to prevent flaking as the completed cards are handled during the manufacture process.

The two colors are highly contrasting, in this example a yellow top layer and a blue substrate. Scratching away the top layer reveals a high contrasting color whereby the player can create their own custom playing card with words or images.

Figure 14:
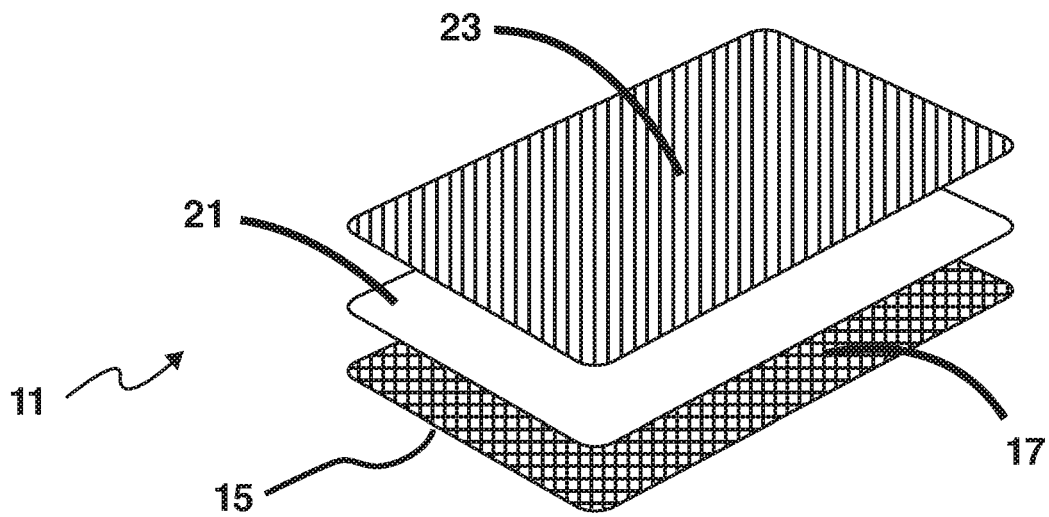
FIG. 14 is an exploded perspective view of the same example of a completed card according to a second embodiment.

Referring to FIG. 14, the second embodiment is illustrated. In this embodiment, the card 11 also has a paper-based card substrate 15 which is surface printed on the playing side 17 in a first predetermined color which in this example is the color blue. This printed color is also protected with a varnish/plastic coating as is known in the production of ordinary playing cards, to prolong their protection in use, but in the embodiment this protects the underlying printed color, when the overlying coatings are scratched off in game play. A silicone release coat is applied over the top of the varnish coating, in order to aid removal of the scratchable surface coating that is to be applied.

Immediately overlying the top of the playing side 17 in order to completely obscure the first predetermined color of the playing side 17, is a friable removable coating 21, over which is printed an ink in a layer 23 which is colored yellow. The friable removable coating 21 is formed from as many coats as necessary of white latex ink. After heat curing of the white latex ink layer or layers, the coating 21 ink is printed over in solid color which may be a color latex ink or other type of ink. If the solid color is a latex ink, it will also need to be heat cured. A clear polyester film or lithographic varnish is then applied to prevent flaking as the completed cards are handled during the manufacture process.

The friable removable coating 21 together with the ink layer 23 are friable and may be scratched off with a coin or the player's fingernail, in order to reveal the playing side 17 in its color of the first predetermined color. As with the first embodiment, the two colors are highly contrasting, in this example a yellow top layer and a blue substrate. Scratching away the top layer reveals a high contrasting color whereby the player can create their own custom playing card with words or images.

A card 11 substrate 15 made of either paper, plastic or another material is printed on or colored into the material on one side (the playing side 17) of the card substrate. The color is a flat color and covers the entire surface area of the playing side 17 the playing card substrate 15. This color can be protected with a varnish coating.

A scratchable material is then applied to the card substrate 17. As an alternative to the latex ink, this concealing coating may contain highly opaque materials such as carbon black pigment or aluminum paste mixed with acrylic resins and appropriate solvents such as methyl ethyl ketone. The resulting coating effectively hides the color beneath but can be easily removed by rubbing. Typically this material is known as a UV curable ink.

UV curable inks are essentially a mixture of colored monomers and oligomers (the individual chemical units that eventually form 'polymers') and reaction 'photo-initiators' that become active when exposed to UV radiation. The monomers and oligomers form a viscous liquid, thus serving simultaneously as the 'pigment' and 'solvent' of a conventional ink; they do not need an organic solvent as a fluid base, and do not 'dry' in air like typical solvent-based inks. On exposure to UV light, the initiators set off the polymerization reaction, rapidly cross-linking the monomers and oligomers into a solid 'plastic' polymer, in a process known as 'curing'. This polymerization process also inspired the alternative naming of UV curable inks as 'latex inks'.

This scratchable surface can either have a flat color mixed into it as described and illustrated in FIG. 13, or another printing process can then be applied onto the scratchable surface (friable removable coating 21) which covers the entire area of the card. The color to be applied will be a flat colour that covers the entire area of the card and will be of high contrast to the underlying color of the card substrate.

Figure 15:
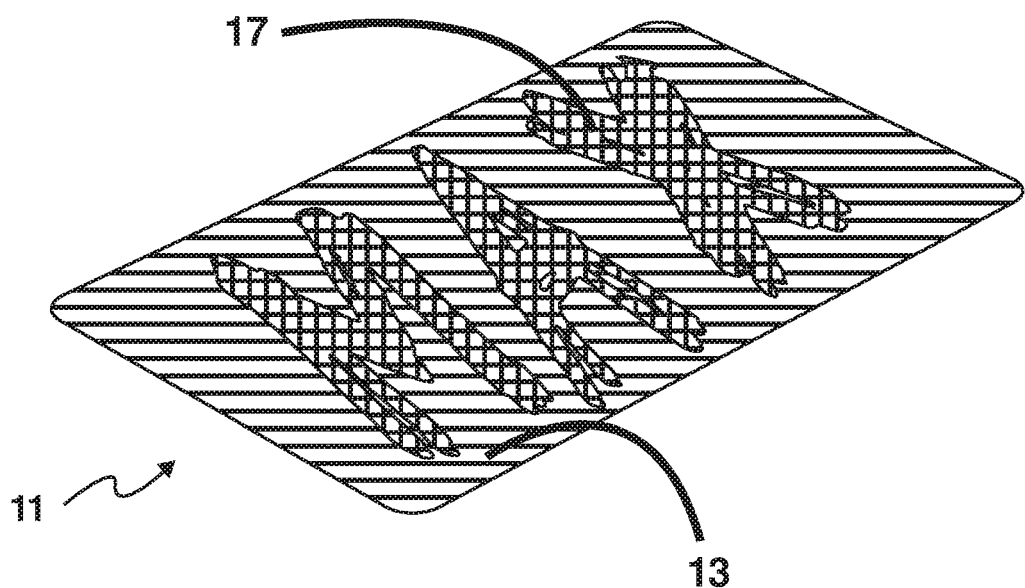
FIGS. 15 to 20 are perspective views of playing cards according to either embodiment that have been modified by players, during play of the Stroop effect card game.

FIG. 15 shows an example of a playing card 11 according to the embodiment being used to create a players name using contrasting colors of blue in the card substrate 17 and red of the removable friable surface coating 13.

Figure 16:
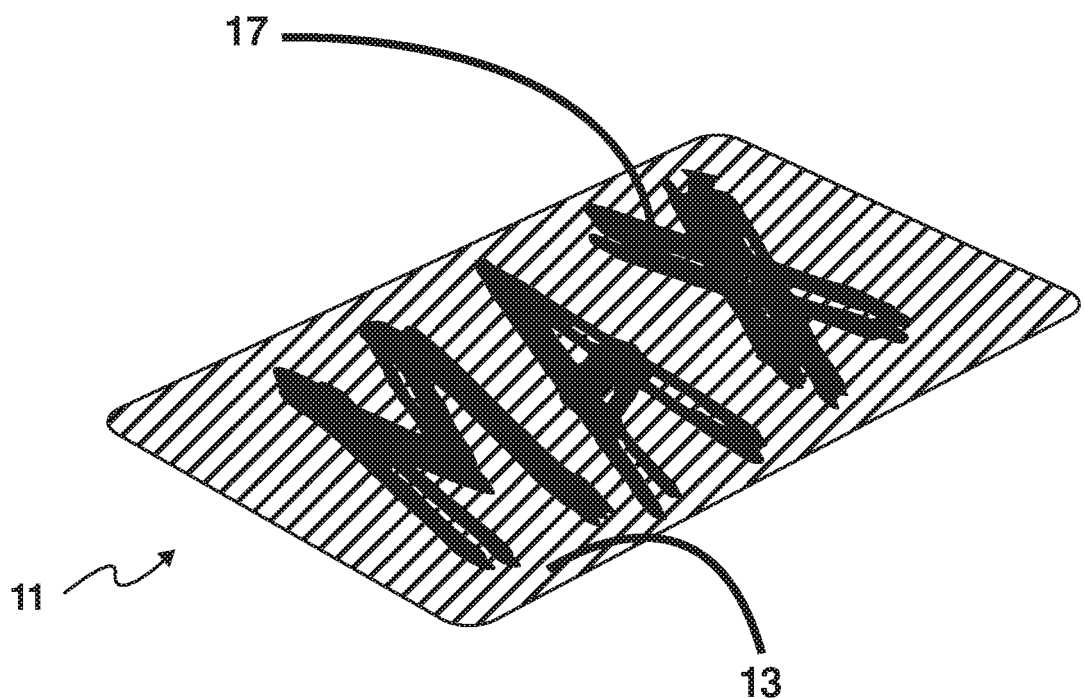

FIG. 16 shows a further example of a playing card 11 according to the embodiment being used to create a players name using contrasting colors of black in the card substrate 17 and green of the removable friable surface coating 13.

Figure 17:
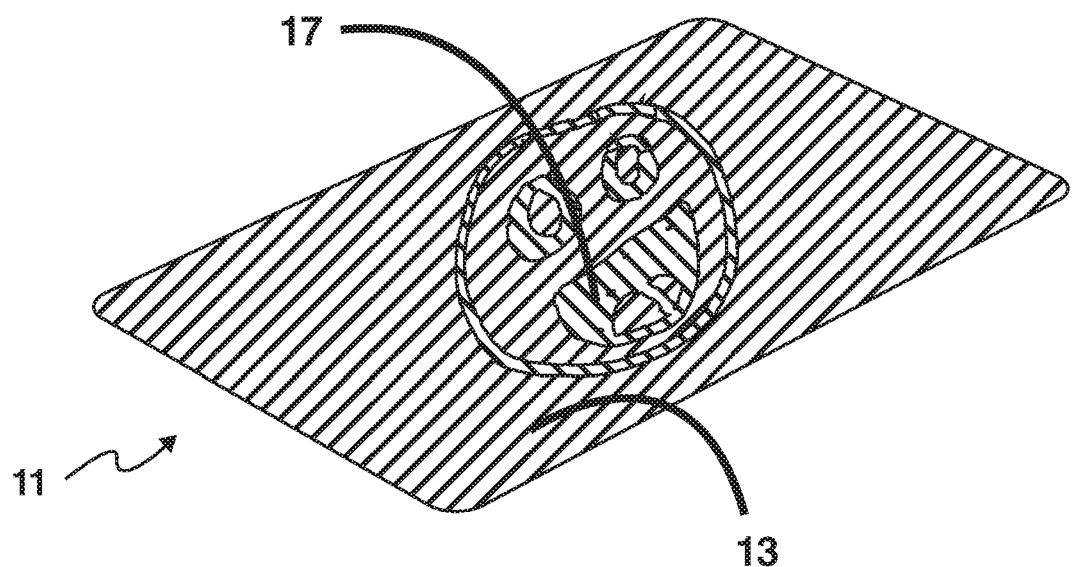

FIG. 17 shows a further example of a playing card 11 according to the embodiment being used to create an image using contrasting colors of orange in the card substrate 17 and green of the removable friable surface coating 13.

Figure 18:
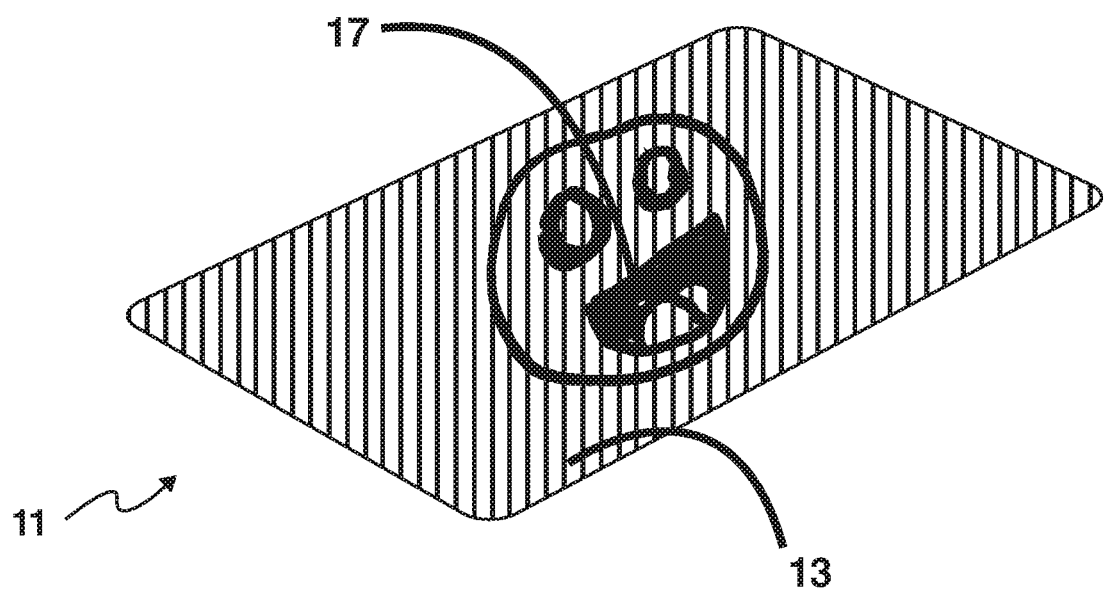

FIG. 18 shows a further example of a playing card 11 according to the embodiment being used to create an image using contrasting colors of black in the card substrate 17 and yellow of the removable friable surface coating 13.

Figure 19:
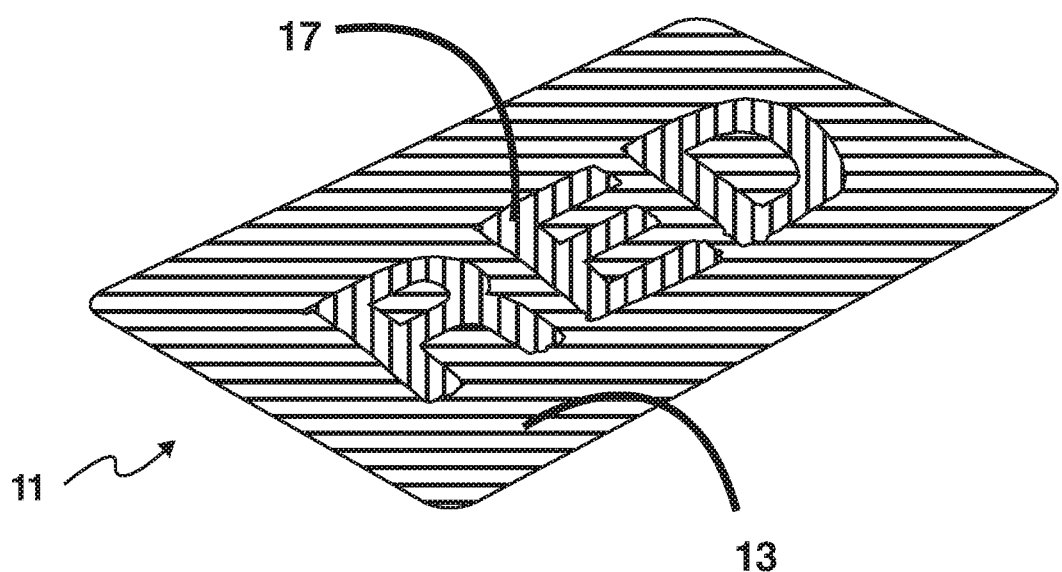

FIG. 19 shows a further example of a playing card 11 according to the embodiment being used to create a color word using contrasting colors. In this example, the player has scratched the word "RED" out of a red colored removable friable surface coating 13 to reveal the underlying yellow color of the card substrate 17.

Figure 20:
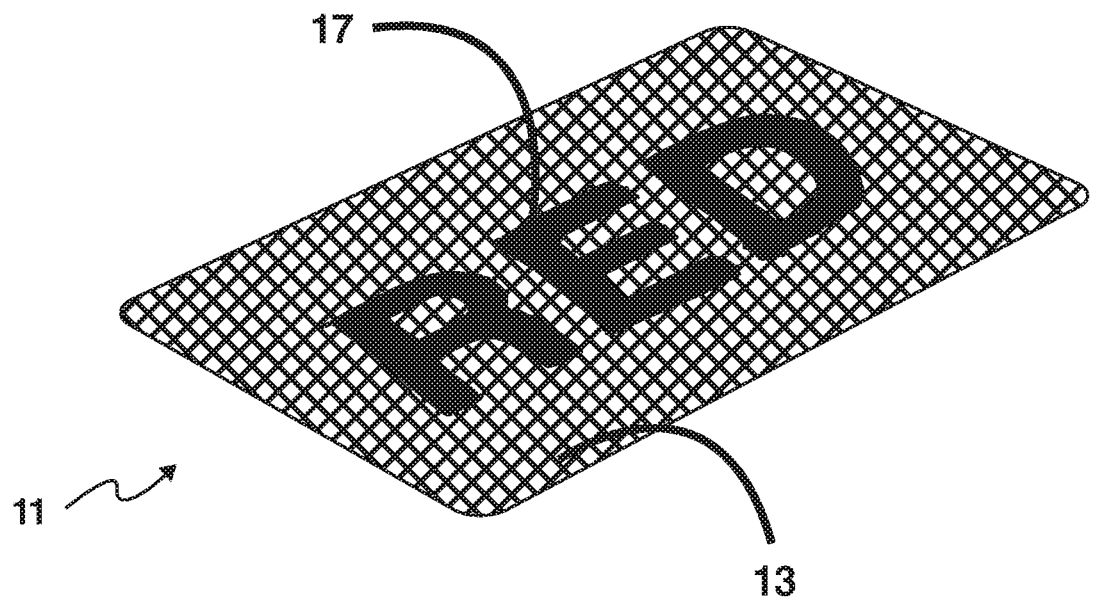

FIG. 20 shows a further example of a playing card 11 according to the embodiment being used to create a color word using contrasting colors. In this example, the player has scratched the word "RED" out of a purple colored removable friable surface coating 13 to reveal the underlying black color of the card substrate 17.

Any of these playing cards 11 can be substituted into the Stroop effect card game for enhanced strategic gameplay, allowing the players to create countless variations of the card game.

Having this ability to instantly scratch off and create contrasting color words or images allows the player to enhance gameplay, strategy and enjoyment of the original stroop and swearing card game when interchanged.

The cards 11 are provided in a pack or deck having various colored removable friable surface coatings 13 each overlaying contrasting colored card substrates 17. These can be provided along with ready-made Stroop effect playing cards of the type illustrated in FIGS. 2 to 11.

The cards are designed to make it possible to easily create letters, words, patterns and images using high contrasting colors that cover the entire area of the playing card. To be used in the context of a non gambling card game. To enhance gameplay and strategy allowing players to instantly choose their own word, image or design and use these cards in conjunction with Stroop effect card games and other strategic card games.

The playing cards can be provided as a stand-alone pack or deck of playing cards in various combinations of card substrate 17 colour and contrasting colored removable friable surface coatings 13.

The claims defining the invention are as follows:

1. A playing card having a substrate with a first surface substantially entirely of a first predetermined color overlaid with a removable surface coating having a second surface substantially entirely of a second predetermined color contrasting with said first predetermined color and completely obscuring the first predetermined color, said removable surface being sufficiently friable so as to be able to be scratched off by a player in a pattern predetermined by said player to reveal said first predetermined color of said substrate in said pattern, wherein:
   the substrate has a playing side;
   a first predetermined color is printed on the playing side of the substrate;
   a varnish or plastic coating is applied over the first predetermined color;
   a silicone release coat is applied over the varnish or plastic coating;
   a removable friable surface coating is applied over the silicone release coat that completely obscures the first predetermined color, wherein the removable friable surface coating has a second predetermined color different from the first predetermined color; and
   a clear polyester film or lithographic varnish is applied over the removable friable surface coating.

2. A playing card as claimed in claim 1 wherein said removable surface coating entirely overlays said substrate.

3. A deck of playing cards comprising at least one card as claimed in claim 2.

4. A deck of playing cards comprising a plurality of playing cards as claimed in claim 2, provided with a plurality of different first predetermined colors and different second predetermined colors.

5. A deck of playing cards comprising at least one card as claimed in claim 1.

6. A deck of playing cards comprising a plurality of playing cards as claimed in claim 1, provided with a plurality of different first predetermined colors and different second predetermined colors.

7. A playing card as claimed in claim 1, wherein the removable friable surface coating comprises one or more coats of white latex ink colored entirely through its composition with a dye of the second predetermined color.

8. A playing card as claimed in claim 7, wherein the removable friable surface coating comprises multiple coats of white latex ink colored entirely through its composition with the dye of the second predetermined color.

9. A playing card as claimed in claim 1, wherein the removable friable surface coating comprises one or more coats of cured white latex ink on which the second predetermined color is printed.

10. A playing card as claimed in claim 9, wherein the removable friable surface coating comprises multiple coats of cured white latex ink on which the second predetermined color is printed.

11. A playing card to be used in a deck of playing cards used in a card game where players take turns to call out information where the card game utilizes the Stroop effect, said playing card having a substrate with a first surface substantially entirely of a first predetermined color overlaid with a removable surface coating having a second surface substantially entirely of a second predetermined color contrasting with said first predetermined color and completely obscuring the first predetermined color, said removable surface being sufficiently friable so as to be able to be scratched off by a player in a pattern predetermined by said player to reveal said first predetermined color of said substrate in said pattern, wherein:
- the substrate has a playing side;
- a first predetermined color is printed on the playing side of the substrate;
- a varnish or plastic coating is applied over the first predetermined color;
- a silicone release coat is applied over the varnish or plastic coating;
- a removable friable surface coating is applied over the silicone release coat that completely obscures the first predetermined color, wherein the removable friable surface coating has a second predetermined color different from the first predetermined color; and
- a clear polyester film or lithographic varnish is applied over the removable friable surface coating.

12. A playing card as claimed in claim 11 wherein said removable surface coating entirely overlays said substrate.

13. A deck of playing cards comprising at least one card as claimed in claim 12.

14. A deck of playing cards comprising a plurality of playing cards as claimed in claim 12, provided with a plurality of different first predetermined colors and different second predetermined colors.

15. A deck of playing cards comprising at least one card as claimed in claim 11.

16. A deck of playing cards comprising a plurality of playing cards as claimed in claim 11, provided with a plurality of different first predetermined colors and different second predetermined colors.

17. A playing card as claimed in claim 11, wherein the removable friable surface coating comprises one or more coats of white latex ink colored entirely through its composition with a dye of the second predetermined color.

18. A playing card as claimed in claim 11, wherein the removable friable surface coating comprises one or more coats of cured white latex ink on which the second predetermined color is printed.

* * * * *